United States Patent [19]
Sheppard

[11] 3,822,759
[45] July 9, 1974

[54] POWER STEERING GEAR ASSEMBLY

[76] Inventor: Richard H. Sheppard, c/o R. H. Sheppard Co., Inc., Hanover, Pa. 17331

[22] Filed: Mar. 7, 1972

[21] Appl. No.: 232,420

[52] U.S. Cl................. 180/79.2 R, 60/455, 92/86, 92/136
[51] Int. Cl............................................. B62d 5/10
[58] Field of Search............. 180/79.2 R; 92/81, 82, 92/86, 136; 60/378, 455

[56] References Cited
UNITED STATES PATENTS

| | | | |
|---|---|---|---|
| 2,334,383 | 11/1943 | Carr et al. | 92/136 X |
| 2,389,654 | 11/1945 | Van Der Werff | 92/136 X |
| 2,709,495 | 5/1955 | Vickers | 180/79.2 R |
| 2,714,285 | 8/1955 | Geary | 92/82 X |
| 2,876,799 | 3/1959 | Mercier | 92/82 X |
| 2,977,167 | 3/1961 | Barnhart | 92/82 |
| 3,012,543 | 12/1961 | Sheppard | 92/136 X |
| 3,288,035 | 11/1966 | Ryzner | 92/136 X |
| 3,602,326 | 8/1971 | Garrison | 180/79.2 R |

Primary Examiner—Robert G. Sheridan
Assistant Examiner—Leslie J. Paperner
Attorney, Agent, or Firm—Lowe, King & Price

[57] ABSTRACT

The cylinder housing of a power steering gear is provided with a hollow piston having a rack meshing with the output gear, also enclosed within said housing. Fluid check valve means are provided at each end of the piston to prevent passage of high pressure working fluid during the power stroke but to allow the escape of high pressure fluid from the hollow interior of the piston to the exhausted or soft side of the piston. Lateral ports are provided in the piston communicating with the hollow interior and with the rack to bleed high pressure fluid from the enclosing space of the output gear so that buildup of fluid pressure due to leakage past the piston sealing rings is prevented. The check valve means are mounted in caps closing off the hollow interior of the piston and fluid is supplied and withdrawn from the chambers through a single fluid transfer hose at each end. The gear assembly is particularly adapted to use as a slave power steering gear unit, which is designed to provide 50 percent of the force in a dual system with 50 percent being handled by the master unit.

8 Claims, 2 Drawing Figures

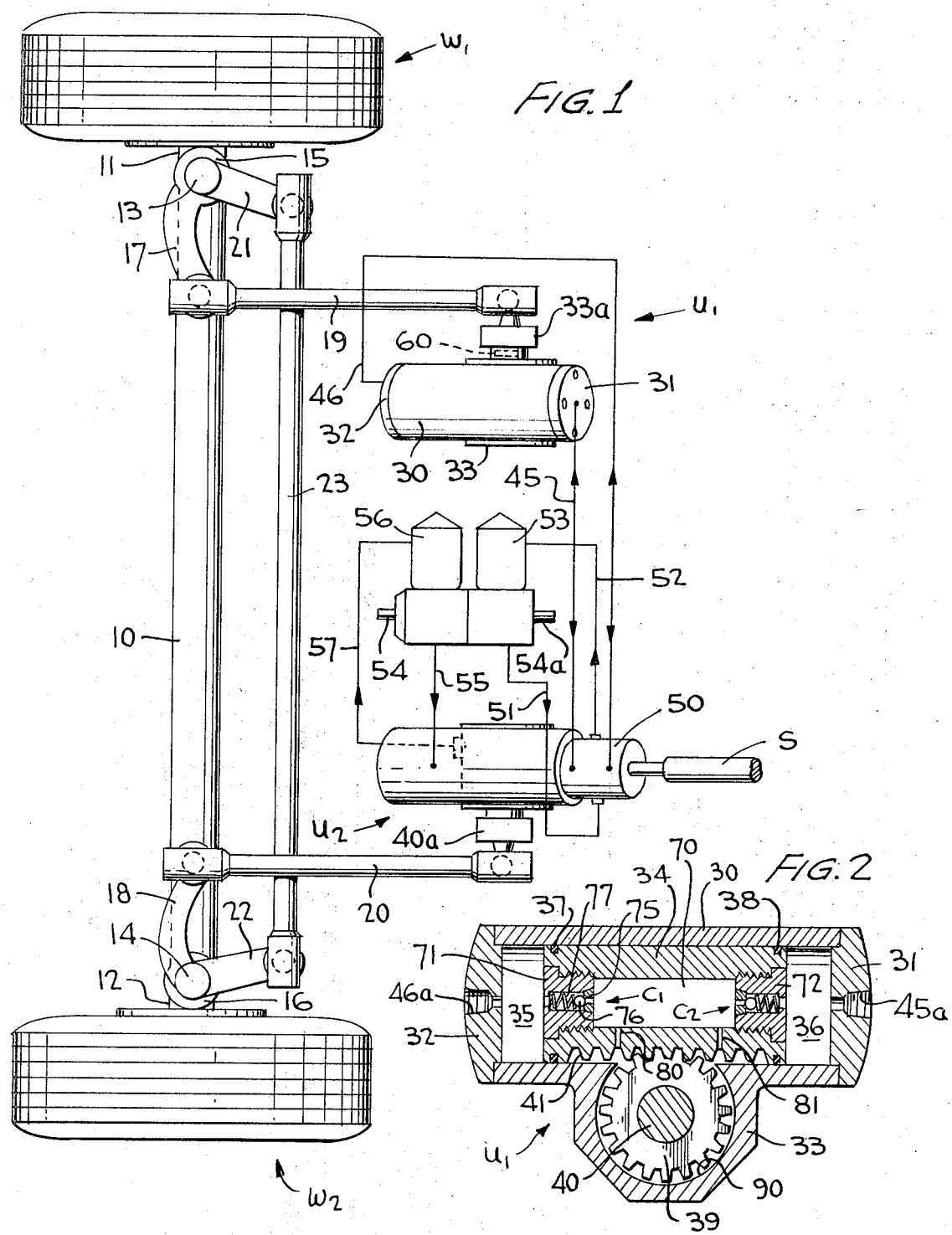

POWER STEERING GEAR ASSEMBLY

The present invention relates to power steering of vehicles, and more particularly, to a power steering gear assembly particularly adapted for use as a slave unit in dual power steering systems.

In the last decade, more and more emphasis is being placed on the development of vehicle safety, and particularly in the field of truck and automobile safety. Many innovations are already introduced into production models, such as seat and shoulder restraining belts, dual cylinder brake systems, improved structural reinforcement in the side areas, key removal responsive steering and transmission locking devices, collapsible steering columns, pop-out windshields and cushion bumpers. In the future, many more innovations relating to safety are destined to be invented and introduced by legislative requirement or voluntarily into motor vehicle construction.

One of the next areas of safety improvement that must be considered is the steering systems of trucks and automobiles. With the increased numbers of vehicles having power steering systems, safety engineers have become increasingly cognizant of the need for a more satisfactory way of avoiding accidents in the instance of the failure of hydraulic pressure in a power steering system, such as is occasioned by failure of the power pump or a critical transfer hose. Most power steering gears allow for manual operation of the system through the power steering gear; however when the driver is accustomed to the use of power steering the sudden loss of the system, particularly when he is unaware of what has happened, tends to cause panicking and inevitably leads to a failure to properly respond to the emergency, and an accident usually results. This is particularly true with large automobiles, and trucks of medium to heavy duty, since the steering requires, in some cases, more force than can be generated by the driver, particularly where the driver is a female of limited physical strength.

Thus to provide a system that is safe in that allowance for failure is provided while maintaining power steering capability, I have invented Dual Power Steering System as covered in my application Ser. No. 236,410, filed March 20, 1972. In this steering system there is employed two separate and complete power steering subsystems, each including a separate pump and separate actuator or steering gear. Each subsystem performs approximately 50 percent of the work necessary to steer the vehicle for which the dual system is designed. With this system, and as explained more fully in the copending application, the capability of the driver to control the vehicle is absolutely maintained in the event of failure of one subsystem, and maintained so that the driver may easily make it to the next service facility for repairs as needed. Of particular importance is that during moderate and high speed driving, the dual system with 50 percent power in each separate subsystem cannot cause a panic situation since, in fact, the 50 percent assist left in the live subsystem steers the wheels without a discernable change in feel or force required over that when the full dual system is operative.

In order to most expeditiously manufacture the dual system of the above-identified application, it is proposed to utilize power steering gear assemblies of the type having a piston and a cylinder with an output gear engaged with a rack on the piston and a valve responsive to the steering shaft, as shown, for example, in my previous patent, Sheppard U.S. Pat. No. 3,092,083, issued June 4, 1963. Theoretically, two power steering gears as shown by this patent could be incorporated at opposite sides of the steering linkage to steer the vehicle. However, it would be much more expensive and perhaps prohibitably so to utilize two complete power steering units of this type. Further, the problem of synchronization between the integral valves of the two units would add substantial cost to the overall system. This high cost of converting to a fail-safe system is one of the most important factors facing the Government and private officials and thus the solving of this problem is considered to be the primary thrust of the present inventive effort.

OBJECTIVES OF THE INVENTION

Accordingly, it is a main object of the present invention to provide a major component of, and in combination, a complete dual power steering system that greatly reduces the cost of manufacture and makes the steering of the vehicle upon which it is installed fail-safe.

It is still another object of the present invention to provide a dual power steering system having a slave gear unit that requires only single hydraulic transfer hoses and a unique system for relieving or bleeding high pressure fluid from the output gear enclosure.

It is still another object of the present invention to provide a steering gear assembly having a hollow piston with check valve means at each end and lateral bleed ports to effect release of hydraulic pressure buildup from the rack and output pinion enclosure

BRIEF SUMMARY OF THE INVENTION

The power steering gear assembly of the present invention includes a cylinder housing, a reciprocating piston defining alternate power and exhaust chambers at the ends of the piston, and means for bleeding the output gear enclosure through the hollow interior of the piston and automatically out through the exhaust or "soft"side of said piston. This bleed means includes a cap at each end of the piston that houses oppositely directed check valve means to resist the escape of fluid during the power stroke and to allow retroflow of exhaust fluid during exhaust of that chamber. The valve means communicates with the hollow interior of the piston and thence through lateral port means to the area of the rack and the output gear enclosure.

The advantages of this power steering gear assembly can now be noted briefly. Due to normal leakage past the sealing rings at the ends of the piston, in prior art devices, it was inevitable that pressure would build up in the area of the output gear, thereby necessitating a seal around the shaft of the output gear that would withstand the constant high pressure. With the present arrangement, only a low pressure seal must be provided around the output shaft since during each power stroke the high pressure fluid that leaks around the piston rings is exhausted through the lateral port means, through the hollow interior of the cylinder and then by lifting the check valve from its seat out through the exhaust side of the piston. The output gear seal must thus withstand only the nonpressurized hydraulic fluid. Even under high frequency repeated turning action of the vehicle, there is no chance that pressure can build up in the area of the output gear since on each stroke the enclosure is directly communicated to the soft side of the piston.

The power steering gear assembly of the present invention is particularly adapted for use as a slave unit in the dual power steering system. Advantageously, only a single hose attachment needs to be provided at each end of the cylinder which thus serves both the power and the exhaust fluid transfer functions. This eliminates completely the provision of a separate exhaust directly attached to the enclosure for the power output gear, as is used in a master power steering unit with valve in the piston, as shown in my previous U.S. Pat. No. 3,092,083.

The hollow construction of the piston is in addition to providing the fluid transfer passageway desirable from a manufacturing standpoint, since the metal may be more efficiently hardened from the exposure of both interior and exterior surfaces. Manufacturing is further improved and the cost minimized by threaded caps that hold the check valve means in the ends of the pistons. Two lateral ports are provided communicating with the rack of the piston to allow for unrestricted flow from the enclosure in any position of the piston.

In accordance with another feature of this combination, the slave unit accommodates approximately 50 percent of the force needed to steer the vehicle and the master unit contributes the other 50 percent. Each unit has its own hydraulic pump so that complete redundancy and thus safety is provided. Should one unit or subsystem fail, the other subsystems can operate the steering system without noticeable difficulty, except perhaps when driving slow and when close parking menuevers are being made. It is even recommended that appropriate warning lights be provided to denote any malfunction of one subsystem to the operator. In any case, the chance to reach the next service facility is unquestionably given and there is no frightening or panic causing sudden change in the steering "feel" that has caused accidents in the past.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of other and different embodiments, and its several details are capable of modification in various obvious respects all without departing from the invention. Accordingly, the drawings and description are to be regarded as illustrative in nature, and not as restrictive.

BRIEF DESCRIPTION OF THE DRAWINGS

FIG. 1 is a schematic view showing the dual power steering system with the slave power steering unit constructed in accordance with the principles of the present invention; and FIG. 2 is a cross-sectional view of the slave gear unit shown in FIG. 1.

DETAILED DESCRIPTION OF THE PREFERRED EMBODIMENT

With reference now to FIG. 1 of the drawing, there is shown in schematic form a dual power steering system that utilizes the principles of the present invention.

Wheels $W_1$, $W_2$ may be provided for a vehicle and supported on a conventional cross axle 10. The wheels $W_1$, $W_2$ are suitably mounted on respective spindles 11, 12, that are supported for pivoting, steering action on pivot pins 13, 14 held in sockets 15, 16 formed in the ends of the axle 10.

Fixed to the pivot pins 13, 14 are corresponding steering arms 17, 18 connected to respective drag links 19, 20. Crank arms 21, 22, also fixed on the pivot pins 13, 14, respectively, are interconnected by a conventional tie rod 23 that assures equal turning and alignment of the wheels $W_1$, $W_2$ at all times. The drag links 19, 20 are operated by two steering subsystems; the first subsystem including a slave steering gear unit $U_1$ and the second subsystem including a master steering gear unit $U_2$. As shown, the physical interconnections of the drag links 19, 20 and the tie rod 23 are made by ball and socket joints to permit the necessary angular and rotative movement.

The slave steering unit $U_1$ includes a cylinder housing 30 with end closure plates 31, 32 and an offset portion 33 formed integrally with the housing and a crank $33a$ extending therefrom. The preferred embodiment of the slave unit $U_1$ is shown in detailed cross section in FIG. 2 of the drawings. Within the cylinder housing 30 reciprocating piston 34 is positioned and forms alternate power and exhaust chambers 35, 36 at opposite ends thereof. Conventional sealing rings 37, 38 may be provided at the ends of the piston to minimize leakage from the chambers 35, 36 when the respective chambers are filled with the pressurized hydraulic fluid during the power stroke. As can be seen in FIG. 2, the offset portion 33 of the housing 30 encloses the output gear 39 and output shaft 40 to which crank $40a$ (shown in FIG. 1) is attached. The piston includes a rack 41 meshing with the gear 39 to effect translating of the power from the reciprocating piston 34 to the output gear 39 and the crank $40a$. The rack 41 is recessed sufficiently to provide a fluid path along the length for a purpose that will be seen later.

The slave gear unit $U_1$ is alternately fed pressurized fluid and exhausted by single transfer hoses 45, 46 connected to the end plates 31, 32 at tapped openings $45a$, $46a$, respectively. With this arrangement, no third hose is needed to exhaust the hydraulic fluid and return it to the sump of the pump, thereby minimizing the cost of manufacture and also importantly minimizing the probability of failure and thus the maintenance requirements.

The slave unit $U_1$ is actually controlled by a suitable piggyback control valve 50 positioned on master steering gear unit $U_2$ and operated by the steering shaft S. With this arrangement of directly controlling the control valve 50 by the steering shaft S and concurrently with the control of the valve in the master unit $U_2$, synchronization may be accomplished. The valve 50 is supplied with and exhausted of fluid through transfer lines 51, 52 connected to a separate combined pump and sump unit 53 driven through drive shaft 54.

As mentioned above, the master steering gear unit $U_2$ is or may be considered essentially like the unit shown in my previous patent, Sheppard, U.S. Pat. No. 3,092,083, or in the alternative, may be like the unit in another of my patents, Sheppard, U.S. Pat. No. 3,566,751. Note in this regard that the control valve would be mounted within the piston (not shown herein) and that an inlet line 55 comes from separate pump assembly 56 driven through a separate drive shaft 54a and that a return or exhaust line 57 returns the low pressure fluid to the sump side of said pump assembly 56. The shafts 54, 54a may be driven through separate belts and pulleys from the motor of the vehicle for added assurance against disabling failure of the steering system. The exhaust line 57 of the master unit $U_2$ is connected in the area of the output gear 39, that is an exhaust hose is required as disclosed in my patent, which arrangement thus relieves any high pressure fluid that might leak by the sealing rings on each power stroke of the piston.

The same pressure buildup problem in the area of the output gear 39 of the slave gear unit $U_1$ has been solved however in quite a different and unique way without the need of the exhaust hose connected to the offset portion 33. Because of this, greater simplicity is gained and lower cost of manufacture, as desired, is the outcome. Of primary importance also, seal 60 (FIG. 1) around the shaft 40 is of the low pressure type since the space around the output gear 39 is always under the influence of the exhaust, as will now be explained.

In FIG. 2, the piston 34 is shown hollow with a cylindrical hollow interior 70. At the ends of the piston 34 support caps 71, 72 threadedly engage cylinder 34 and serve to mount check valve means, generally designated by the reference indicia $C_1$, $C_2$.

The check valve means $C_1$ and $C_2$ each includes a removable seat 75 for receiving the ball member 76 biased into position by a spring 77. The seat 75 contains an opening communicating wiht the interior space 70 and the opposite end of the check valve means communicates with the respective chambers 35, 36. Because of the removability of the seat 75 and the integral construction of the valve means $C_1$, $C_2$ within the caps 71, 72, the parts are easily assembled and readily removable for service.

A pair of lateral transfer ports 80, 81 form a fluid interconnection between the area of the rack 41 and the hollow interior 70 of the piston 34. The ports 80, 81 are spaced adjacent opposite ends of the rack so that as the piston moves and the output gear 39 is rotated to bring respective teeth into mating relationship with the ends of one of the ports, the other port is assured of being free of the gear teeth and thus fully capable of rapid transfer of fluid.

In operation, the fluid that is desired to be bled from the system in the unique way, is trapped in the space or enclosure 90 that accommodates the output gear 39 in offset portion 33. The high pressure hydraulic fluid has leaked into the space 90 around the sealing rings 37, 38. Especially under temporary high frequency steering action, pressure could build up to a substantial level if there was no capability of draining or bleeding this high pressure fluid. Such is accomplished in accordance with the present invention through one or both of the ports 80, 81 through the hollow interior 70, thence through the inside opening in the check valve means $C_1$ or $C_2$ that happens to be on the exhaust or soft side in any particular stroke of the piston 34 by lifting the ball 76 from its seated position and through the openings in the top of the caps 71, 72 to the respective exhaust chamber 35 or 36 and out the respective transfer hoses 45, 46 fitted in the tapped openings 45a, 46a. On the power side of the piston 34, the ball 76 is being assisted by the hydraulic pressure to be firmly fixed to the seat 75 and thus prevent leakage in the driving direction.

It is known that a pressure of approximately 5 pounds per square inch is the most desirable pressure for adequate release of the trapped fluid. When the pressure within the hollow interior 70 as bled from the space 90 reaches this range, the chamber 35 or 36 serving as the exhaust depending upon the particular movement of the piston 34 at that time, receives the fluid through the path described. After the pressure is thus relieved and the ball 76 is returned to the closed position by the spring 77, the chamber is now ready to serve as a power chamber.

The slave power steering subsystem includes the slave gear unit $U_1$, the control valve 50 and the separate pump 53; whereas, the main unit subsystem includes a power steering gear unit $U_2$ with integral valve means and a pump 56. Each unit $U_1$, $U_2$ preferably generates approximately 50 percent output force required for conveniently steering the wheels $W_1$, $W_2$ under normal every-day driving. If one pump 53, 56 or one steering gear unit $U_1$, $U_2$ should fail for some reason, the redundancy built into the system allows the steering to proceed without the operator noticing a change except through a warning light or until there is a turn made in deep mud or snow, or in tight maneuvering or parking activities. In any case, there is no danger of causing an accident, and the service facility may be reached with ease even if extended distances, such as several hundred miles, must be driven after failure of one of the subsystems. In countries where populated areas are widely spaced, such as Australia, this latter feature is of great importance since a breakdown can mean not only loss of time but also loss of the cargo if it is perishable.

In view of the foregoing, it is believed now apparent that the steering system of the present invention is not only safer but can be easily and economically manufactured and at the same time be more efficient and require less maintenance. This slave gear unit $U_1$ is synchronized with the main unit $U_2$ through use of the piggyback valve 50 and only two dual purpose hydraulic transfer lines or hose 45, 46. The seal 60 is a trouble-free and inexpensive low pressure type since the pressure buildup in the space 90 around the output gear 39 due to inevitable leakage past the seals 37, 38 is relieved. If close manufacturing tolerances are observed, the seals 37, 38 may be eliminated when the present invention is used since the relief paths through the valves $C_1$, $C_2$ have sufficient capacity and are operative during every power stroke to provide any necessary degree of relief required. The check valves $C_1$, $C_2$ release the pressure buildup on the exhaust side, but advantageously operate in the opposite direction to form a seal on the power side.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein. I claim:

1. A power steering gear assembly and steering system for a vehicle having wheels or the like comprising a cylinder housing, a double acting piston in said housing forming chambers at opposite ends, said ends being fixed relative to each other and a fixed length rack formed on one side of said piston, an output steering gear meshing with said rack, a steering crank connected to said gear, steering linkage between said crank and said wheels, a low pressure space in said housing separated from said chambers by the ends of said pistons and enclosing said gear, single fluid transfer means for each of said chambers to allow alternate introduction of high pressure working fluid to one of said chambers to power the piston and concurrent exhausting of the other chamber, check valve means at each end of said piston communicating with the adjacent chamber and having closed positions in opposite directions so as to prevent escape of high pressure working fluid from said one chamber, passageway means in said piston communicating with said check valve means and said low pressure space, said check valve means allowing escape of fluid from said low pressure space to said other chamber being exhausted, whereby build-up of fluid pressure in said space is prevented.

2. The assembly and system of claim 1 wherein said piston is formed hollow along the length, said passageway means includes the hollow interior of said piston, and cap means concentric with said piston for housing each check valve means and spring means in said cap means assuring closing off the ends of the hollow interior against admission of high pressure fluid.

3. The assembly and system of claim 2 wherein said cap means are threadably engaged with said piston and is the sole support for said valve means.

4. The assembly and system of claim 1 wherein said piston is formed hollow along the length, said passageway means includes the hollow interior of said piston and lateral port means from said interior to the exterior of said piston at said rack and communicating with said space, said rack being recessed sufficiently to allow transfer of fluid therefrom, whereby escape of fluid to said space may be effected at any position of said piston along said cylinder.

5. The assembly and system of claim 4 wherein said port means includes a first and second port adjacent opposite ends of said piston to allow substantially unrestricted flow from said space in any shifted position of said piston.

6. The assembly and system of claim 1 wherein said check valve means at each end comprises a ball, a seat on the side toward said low pressure space, and a spring biasing said ball against said seat, said spring being only sufficient to allow unseating and exhaust at approximately 5 pounds per square inch.

7. The assembly and system of claim 6 wherein is included cap means housing said check valve means, said seat being integral with said cap and removable to allow easy replacement of parts of said check valve means.

8. The assembly and system of claim 1 wherein said chambers communicate directly with said valve means, said fluid transfer means comprises first and second fluid lines to accommodate both pressure and exhaust for respective ones of said chambers, first and second end plate means for closing the ends of said cylinder housing, and means for attaching said lines to respective ones of said end plate means.

* * * * *